May 14, 1940.  R. H. PROCTER  2,200,995

CIRCUIT CONTROLLER

Filed Feb. 5, 1937

WITNESSES:
C. J. Weller.
G. S. Parker

INVENTOR
Richard H. Procter.
BY
Ralph H. Swingle
ATTORNEY

Patented May 14, 1940

2,200,995

UNITED STATES PATENT OFFICE 2,200,995

CIRCUIT CONTROLLER

Richard H. Procter, Springfield, Mass., assignor to Westinghouse Electric & Manufacturing Company, East Pittsburgh, Pa., a corporation of Pennsylvania Application February 5, 1937, Serial No. 124,251

26 Claims. (Cl. 200—83)

My invention relates to circuit controlling devices in general, and more particularly to circuit controlling devices for automatically controlling electrically operated apparatus, such as electric refrigerators or the like, in response to temperature conditions.

Electric refrigerators are usually provided with a circuit controlling device in the form of a switch which is actuated by a temperature responsive device to automatically control the motor circuit of the refrigerator in accordance with the temperature existing in the refrigerator compartment. The temperature responsive device closes the switch to energize the motor circuit when the temperature within the refrigerating compartment rises to a predetermined value and opens the switch to deenergize the motor circuit when the temperature drops to a predetermined value, thus automatically keeping the temperature within the refrigerating compartment within predetermined high and low limits.

A circuit controlling device for such use must among other things, be extremely reliable in operation, must embody an actuating mechanism which will open and close the circuit controlling contacts with a snap action when the critical temperature limits are reached in order to reduce undesirable arcing at the contacts, and must embody an adjusting means for adjusting the temperature limits to which the switch will respond.

In contrast to the above-mentioned operational requirements, the circuit controlling device must be inexpensive to manufacture.

Very few of the circuit controlling devices that have heretofore been known or used have been entirely satisfactory. The actuating mechanism and the adjusting means have been relatively complicated and unreliable, resulting in an expensive switch which requires periodic delicate adjustment and frequent repairs.

In certain applications it is particularly desirable that some means be provided for automatically opening the contacts to interrupt the motor circuit after the circuit has been closed in response to rising temperature, if the temperature continues to rise due to the failure of some part of the mechanism of the refrigerator.

It is, accordingly, an object of my invention to provide an improved circuit controlling device which will satisfactorily meet all the previously enumerated operational requirements.

Another object of my invention is the provision of an improved circuit controlling device of the character set forth that is simpler, more reliable in operation and less expensive to manufacture than circuit controlling devices of the same general type that have heretofore been known or used.

Another object of my invention is the provision of an improved circuit controlling device of the character set forth which embodies an improved actuating mechanism for securing quick make and break action of the circuit controlling contacts thereof.

Another object of my invention is the provision of an improved circuit controlling device of the character set forth in which is embodied an improved snap acting actuating mechanism for securing quick make and break action of the contact means, and which is provided with a simple and improved adjusting means for predetermining the temperatures at which the contact means will be operated.

Another object of my invention is the provision of an improved circuit controlling device of the character set forth which embodies a simple actuating mechanism for automatically opening the contact means thereof with a snap action at a predetermined low temperature value, for closing the contact means with a snap action at a predetermined high temperature value, and for opening the contact means when the temperature rises a predetermined amount above said predetermined high value.

The novel features that I consider characteristic of my invention are set forth in particular in the appended claims. The invention itself, however, both as to structure and operation together with additional objects and advantages thereof will best be understood from the following detailed description of the specific embodiments thereof when read in connection with the accompanying drawing, in which:

Figure 1:
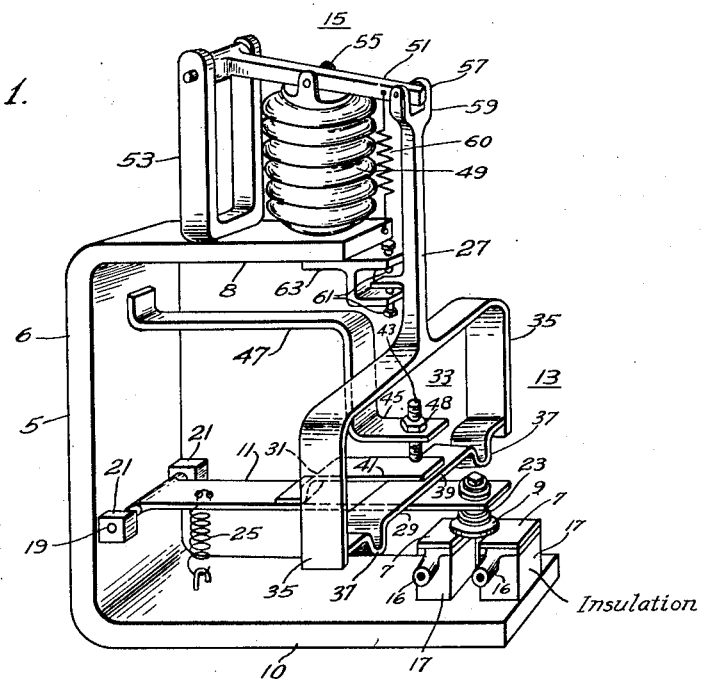
Figure 1 is a perspective view of the circuit controlling device embodying the features of my invention.

Referring to the drawing, the circuit controlling device illustrated comprises in general a frame 5, a pair of stationary contacts 7, a cooperating movable bridging contact 9, a movable switch member 11 for carrying the movable contact 9, snap acting actuating mechanism indicated generally at 13, and a temperature responsive control means, indicated generally at 15.

The frame 5 comprises a strip of light strong metallic material bent in the shape of a U, as shown in Fig. 1, to provide a vertical portion 6 and upper and lower horizontal legs 8 and 10. The frame 5 provides a means for supporting the various parts of the circuit controlling device.

The stationary contacts 7 are mounted on a pair of spaced insulating blocks 17 secured to the forward end of the lower leg 10 of the frame 5. Each of the stationary contacts 7 is provided with a terminal connector 16 for the purpose of connecting the contacts to a control circuit.

The movable switch member 11 is pivotally mounted to the vertical portion 6 of the frame 5 by means of a pivot pin 19, the ends of which are supported by a pair of spaced lugs 21 which are secured to the vertical portion of the frame 5. The forward end of the switch member 11 extends to a position over the stationary contacts 7 and carries a movable bridging contact 9. The movable contact 9 is mounted on the forward end of the switch member 11 by means of a resilient coil spring mounting means 23, the purpose of which is to prevent the bouncing of the switch member 11 during circuit closing operations from causing secondary interruptions of the control circuit. The switch member 11 is biased toward closed circuit position by means of a coil spring 25, the upper end of which is secured to the switch member 11 and the lower end of which is inchored to the lower horizontal leg 10 of the frame 5.

The snap acting actuating means for the movable switch member 11 and contacts 7 and 9 comprises in general, a movable yoke member 27, a snap acting overcenter spring strip 29, a coupling bracket 31 and an adjustable stop 33. The movable yoke 27 is provided with spaced depending leg portions 35 for carrying the overcenter spring strip 29. The ends of the overcenter spring strip 29 are secured to the lower ends of the legs 35 of the operating member 27 in any shiftable manner. The strip 29 is provided with crimped portions 37 adjacent each end of the strip in order that the central portion 39 of the strip may be capable of having a greater length of movement than the length of movement of the operating member 27 and to permit the strip to snap overcenter from one extreme position to the other in response to a predetermined movement of the yoke 27. The overcenter spring strip 29 is held in stressed bowed condition between the legs of the yoke member 27 in the manner shown in Figs. 2 and 3. The center portion 39 of the strip 29 is coupled to the switch member 11 by means of the coupling bracket 31, the rear offset end of which is secured to the switch member 11. The central portion 39 of the strip 29 is adapted to be disposed between the forward end 41 of the bracket 31 and the switch member 11. The coupling bracket 31 thus provides a lost motion connection between the central portion 39 of the overcenter spring strip 29 and the switch member 11.

The adjusting means 33 comprises an adjusting screw 43 which is threaded through an opening formed in the forward offset end 45 of a bracket 47. The rear end of the bracket is secured to the vertical portion 6 of the main frame 5 in any suitable manner, as for example by welding or brazing. The adjusting screw 43 is provided with a lock nut 48 for locking the screw 43 in adjusted position. The purpose of the adjusting screw 43 is to provide a means for predetermining the amount of movement of the yoke member 27 necessary to cause the overcenter spring strip 29 to snap through its dead center position and move the switch member 11.

The movable yoke member 27 is adapted to be moved in one direction or the other to actuate the switch by the temperature responsive control means 15. The temperature responsive control means 15 is of the well known Sylphon bellows type, and the fluid within the bellows expands and contracts in response to temperature changes. The Sylphon bellows 49 is supported at its lower end on the upper horizontal leg 8 of the main frame 5. The upper end of the movable yoke member 27 is connected to the upper end of the Sylphon bellows 49 by means of a lever arm 51. The lever arm 51 is pivotally supported by means of a U-shaped bracket 53 which is secured to the upper horizontal leg 8 of the main frame 5. The central portion of the lever arm is pivotally connected to a bifurcated metal cap piece 55 mounted on the top of the bellows 49 and the forward end of the lever arm is pivotally connected by means of a pin 57 to the forked upper end 59 of the movable yoke 27. The bellows 49 is adapted to expand with an increase in temperature and under such condition moves the yoke member 27 in an upward direction by means of the lever arm 51 to effect movement of the switch member 11 to closed circuit position. When the temperature surrounding the bellows decreases, the gas within the bellows contracts and a tension spring 60 connected to the lever arm 51 and to the upper leg 8 of the frame 5 causes the movable yoke member 27 to be moved in a downward direction to actuate the switch member 11 to open circuit position.

The circuit controlling device is adapted to be mounted in the refrigerating compartment of an electric refrigerator and the terminal connectors 16 are connected in a control circuit for the motor of the refrigerating unit.

The operation of the device is as follows: With the parts in the position shown in Fig. 2, that is, with the movable switch member 11 and the movable contact 9 in the open circuit position, let it be assumed that the temperature in the refrigerating compartment surrounding the Sylphon bellows 49 increases. The increase in temperature causes the bellows 49 to expand and move the yoke member 27 in an upward direction. Since the coupling bracket 31 is engaged by the adjusting screw 43, the central portion 39 of the overcenter spring strip is held against movement because of its engagement with the forward extension 41 of the coupling bracket 31. The upward movement of the yoke 27 moves the outer ends of the strip 29 upwardly relative to the central portion 39 which is held stationary by reason of the adjusting screw 43. At a predetermined point in the upward movement of the yoke 27 corresponding to the high temperature limit for which the device is set, the central portion 39 of the overcenter spring strip 29 passes through dead center position and the stressed condition of the strip causes the same to snap overcenter to the position shown in Fig. 3. This overcenter movement of the strip 29 causes the same to engage and move the switch member 11 to closed circuit position with a snap action, which causes the movable contact 9 to engage and bridge the stationary contacts 7 to close the control circuit for the motor of the refrigerating unit. It will thus be seen that while the yoke member 27 moves upwardly at a very slow rate with increasing temperature the provision of the snap acting actuating means causes switch member 11 to be moved to closed circuit position with a snap action at a predetermined point in the upward movement of the yoke 27, the predetermined point corresponding to the upper temperature limit for which the device is set by means of the adjusting screw 43. In most cases this upper temperature limit for which the device is set is usually slightly below 50° F. If in any particular case it is desired that the switch member 11 be closed at a lower temperature, the adjusting screw 43 is turned in a clockwise direction to lower the same. The lowering of the adjusting screw moves the central portion of the overcenter spring strip 29 nearer its dead center position, so that a smaller amount of upward movement of the yoke is required to cause the strip 29 to snap overcenter and move the switch member 11 to closed circuit position. Raising of the adjusting screw 43 has substantially the opposite effect, that is a greater upward movement of the yoke is necessary before the switch member 11 is moved to closed circuit position, so that the device will not respond until a higher temperature is reached.

Figure 2:
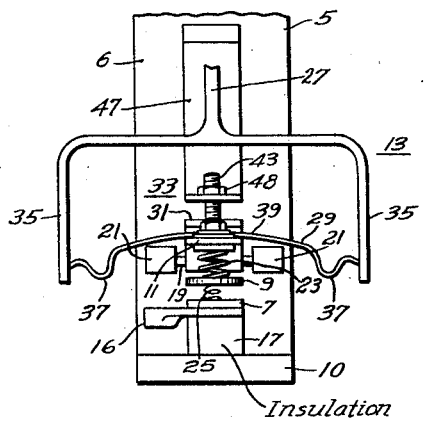
Fig. 2 is a fragmentary front elevational view of a portion of the circuit controlling device showing the contact means thereof in the open circuit position.
Figure 3:
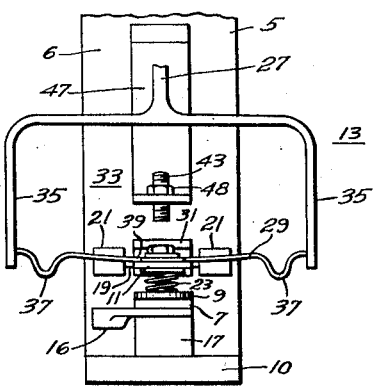
Fig. 3 is a view similar to Fig. 2, showing the contact means of the circuit controlling device in the closed circuit position.

With the device in the closed circuit position as shown in Fig. 3, let it be assumed that the operation of the motor has reduced the temperature a sufficient amount. As the temperature is reduced, the Sylphon bellows contracts and this, together with the force exerted by the spring 60, effects downward movement of the yoke member 27. During the initial part of the downward movement of the yoke, a coil spring 23 which connects the movable contact 9 to the switch member 11 is compressed until a point is reached in which the force exerted thereby is sufficient to prevent any further downward movement of the center portion 39 of the overcenter spring strip 29. Further downward movement of the operating member 27 causes the ends of the spring strip 29 to be moved downwardly relative to the center portion, and at a predetermined low temperature limit the central portion of the strip is moved through dead center position which causes the spring strip to snap overcenter to the bowed position shown in Fig. 2. The snap acting overcenter upward movement of the central portion 39 of the strip 29 causes the same to engage the forwardly extending portion 41 of the coupling bracket 31 and move the switch member 11 to its open circuit position with a snap action.

The biasing action of the spring 25 on the switch member 11 holds the switch member in closed circuit position and supplies the necessary contact pressure during the movement of the spring strip through its dead center position until it engages the bracket 41. The final open circuit position of the switch is shown in Fig. 2. The opening of the contacts causes deenergization of the motor circuit and the switch member 11 remains in the open circuit position until the temperature in the refrigerating compartment again rises to the upper critical limit, at which time the switch is again closed with a snap action in the manner previously described. A pair of adjustable stops in the form of adjusting screws 61 may be provided for preventing over-travel of the yoke member 27. These stop screws are supported by the legs of a yoke 63 which is secured to the upper leg 8 of the frame 5. The upper stop screw 61 limits upward movement of the yoke 27 so that it will not move upwardly a sufficient amount to lift the movable contact 9 off of the stationary contact if the temperature continues to rise as, for example, when the refrigerator motor is disconnected from its source of supply. This stop thus insures that the motor will start when the power cord of the motor is plugged in after a period of inoperation or after a long interruption of power service.

In certain applications it may be desirable to provide for automatic opening of the contacts when the temperature of the refrigerating compartment continues to rise after the contacts have been closed at the upper temperature limit. The circuit controlling device previously described may be arranged to perform this function by either raising the upper adjusting stop screw 61 or by omitting this screw and its support entirely. Under such conditions if the temperature continues to rise due to some failure of a part of the refrigerating apparatus, the continued upward movement of the yoke 27 finally results in the lifting of the movable contact 9 off of the stationary contacts 7 to effect deenergization of the motor circuit. This is particularly desirable because otherwise the motor would continue to operate for a considerable period of time before the fault was discovered and might result in damage to the apparatus.

The provision of the overcenter spring strip which is carried by the operating yoke 27 and the specific lost motion coupling means for coupling the strip to the switch member 11 provides a simple and efficient means for securing quick make and/or break action of the contacts at predetermined points in the movement of the yoke member 27. Unless some means were provided for securing quick make and break action of the contacts, the slow movement of the yoke or operating member produced by the relatively slow changes in temperature would cause the contacts to operate so slowly during each opening operation that the arc formed would soon damage or fuse the contacts.

The improved actuating means which I have disclosed for securing a quick make and break action of the contacts of the control device provides a much simpler, more reliable and less expensive structure than has heretofore been known or used.

The adjusting means comprising the screw 43 and its cooperative arrangement with the actuating means provides a simple, positive and reliable adjusting means for predetermining temperature limits to which the device will respond.

While I have shown and described the preferred embodiments of my invention in accordance with the patent statutes, it will be understood that various changes in the details of the structure may be made without departing from the spirit of my invention. I desire, therefore, that the invention be limited only by the reasonable construction of the appended claims and the prior art.

I claim as my invention:

1. In a circuit controlling device relatively movable contacts, a switch member movable to open or to closed circuit position to open or to close said contacts, actuating means for moving said switch member to open or to closed circuit position with a snap action to secure quick make or break action of said contacts comprising a movable operating member, an overcenter toggle device carried by said operating member, and a lost motion connection coupling said switch member to said toggle device.

2. In a circuit controlling device relatively movable contacts, actuating means for moving said contacts to open or to closed circuit position with a snap action comprising a yoke member, an overcenter spring strip carried by said yoke member between the legs thereof and coupled to one of said contacts, said contacts being mounted separately of said spring strip, and one of said contacts being resiliently mounted on its carrier and biased relative to its carrier toward the other contact.

3. In a circuit controlling device relatively movable contacts, actuating means for moving said contacts to open or to closed circuit position with a snap action comprising a yoke member, and an overcenter spring strip carried by said yoke member between the legs thereof and coupled to one of said contacts, and means associated with said contacts for preventing secondary interruptions due to bouncing of the contacts on closing of the same.

4. In a circuit controlling device relatively movable contacts, actuating means for opening or closing said contacts with a snap action comprising a member having spaced apart arms, and an overcenter spring strip carried by said member between the arms thereof and having a lost motion connection with the movable contact, temperature responsive means for moving said member to open or to close said contacts in accordance with predetermined ambient temperature conditions, and stops independent of said contacts for limiting movement of said member.

5. In a circuit controlling device, relatively movable contacts, a pivoted switch member movable to open or to closed circuit position to open or to close said contacts, actuating means for moving said switch member to open or to closed circuit position with a snap action to secure quick make and break action of said contacts comprising a movable yoke, a snap acting overcenter spring device carried by said yoke between the legs thereof and coupled to said switch member, and temperature responsive means for moving said yoke to operate said switch member in accordance with predetermined temperature conditions, one of said contacts being resiliently mounted on said switch member.

6. In a circuit controlling device, relatively movable contacts, a switch member movable to open or to closed circuit position to open or to close said contacts, actuating means for moving said switch member to open or to closed circuit position with a snap action to secure quick make and break action of said contacts comprising a movable yoke, a snap acting overcenter spring device carried by said yoke between the legs thereof and coupled by a lost motion connection to said switch member, an expansible bellows for moving said yoke to operate said switch member in response to predetermined conditions, and a pair of adjustable stops independent of said contacts for limiting the travel of said yoke.

7. In a circuit controlling device, relatively movable contacts, a switch member movable to open or to closed circuit position to open or to close said contacts, actuating means for moving said switch member to open or to closed circuit position with a snap action to secure quick make and break action of said contacts comprising a movable yoke, a snap acting overcenter spring strip carried by said yoke between the legs thereof and coupled to said switch member, the movement of said yoke a predetermined amount in one direction when said contacts are closed causing said strip to snap overcenter and move said switch member to open circuit position with a snap action, and the movement of said yoke a predetermined amount in the opposite direction when said switch member is in the open circuit position causing said strip to snap overcenter and move said switch member to closed circuit position with a snap action, one of said contacts being spring biased toward the other contact to maintain a predetermined contact pressure when said strip is passing overcenter during an opening operation.

8. In a circuit controlling device, relatively movable contacts, a switch member movable to open or to closed circuit position to open or to close said contacts, actuating means for moving said switch member to open or to closed circuit position with a snap action to secure quick make and break action of said contacts comprising a movable yoke, a snap acting overcenter spring strip carried by said yoke between the legs thereof and coupled to said switch member, the movement of said yoke a predetermined amount in one direction when said contacts are closed causing said strip to snap overcenter and move said switch member to open circuit position with a snap action and the movement of said yoke a predetermined amount in the opposite direction when said switch member is in the open circuit position causing said strip to snap overcenter and move said switch member to closed circuit position with a snap action, adjusting means independent of said contacts for changing the amount of movement of the yoke necessary to cause the strip to snap overcenter.

9. In a circuit controlling device, relatively movable contacts, a switch member movable to open or to closed circuit position to open or to close said contacts, actuating means for moving said switch member to open or to closed circuit position with a snap action to secure quick make and break action of said contacts comprising a movable yoke, a snap acting overcenter spring strip carried by said yoke between the legs thereof and coupled to said switch member through a lost motion connection, the movement of said yoke a predetermined amount in one direction when said contacts are closed causing said strip to snap overcenter and move said switch member to open circuit position with a snap action and the movement of said yoke a predetermined amount in the opposite direction when said switch member is in the open circuit position causing said strip to snap overcenter and move said switch member to closed circuit position with a snap action, and temperature responsive means for moving said yoke in one direction or the other in accordance with temperature changes, one of said contacts being spring biased toward said other contact and having limited movement relative to its support.

10. In a circuit controlling device, relatively movable contacts, a switch member movable to open or to closed circuit position to open or to close said contacts, actuating means for moving said switch member to open or to closed circuit position with a snap action to secure quick make or break action of said contacts comprising a movable yoke, a snap acting overcenter spring strip having its ends secured to the legs of said yoke and its central portion coupled to said switch member, said strip being crimped adjacent each end, the movement of said yoke a predetermined amount in one direction when said switch member is in closed circuit position causing the central portion of said strip to be moved through dead center to move the switch member to open circuit position with a snap action, and the movement of said yoke in the opposite direction when said switch member is in open circuit position causing the central portion of said strip to be moved through dead center to move the switch member to closed circuit position with a snap action, one of said contacts being mounted on said switch member for limited movement relative thereto and being spring biased toward said other contact.

11. In a circuit controlling device, relatively movable contacts, a switch member movable to open or to closed circuit position to open or to close said contacts, actuating means for moving said switch member to open or to closed circuit position with a snap action to secure quick make and break action of said contacts comprising a movable yoke, an overcenter spring strip having crimps formed therein adjacent each end, the ends of said strip being secured to the legs of said yoke, a lost motion connecting means coupling the central portion of said strip to said switch member, an adjustable stop cooperating with the central portion of said strip and limiting the opening movement of said switch member, the movement of said yoke a predetermined amount in one direction when said switch member is in closed circuit position causing the central portion of said strip to be moved overcenter to effect movement of said switch member to open circuit position with a snap action, the movement of said yoke a predetermined amount in the opposite direction when the switch member is in open circuit position causing the stop member to effect relative movement of the central portion of said strip overcenter to move said switch member to closed circuit position with a snap action.

12. In a circuit controlling device, relatively movable contacts, a switch member movable to open or to closed circuit position to open or to close said contacts, actuating means for moving said switch member to open or to closed circuit position with a snap action to secure quick make and break action of said contacts comprising a movable yoke, an overcenter spring strip having crimps formed therein adjacent each end, the ends of said strip being secured to the legs of said yoke, a lost motion connecting means coupling the central portion of said strip to said switch member, an adjustable stop cooperating with the central portion of said strip and limiting the opening movement of said switch member, the movement of said yoke a predetermined amount in one direction when said switch member is in closed circuit position causing the central portion of said strip to be moved over center to effect movement of said switch member to open circuit position with a snap action, the movement of said yoke a predetermined amount in the opposite direction when the switch member is in open circuit position causing the stop member to effect relative movement of the central portion of said strip overcenter to move said switch member to closed circuit position with a snap action, and temperature responsive means for moving said yoke in one direction or the other in accordance with temperature changes.

13. In a circuit controlling device, relatively movable contacts, a switch member movable to open or to closed circuit position to open or to close said contacts, actuating means for moving said switch member to open or to closed circuit position with a snap action to secure quick make or break action of said contacts comprising a movable yoke, a snap acting overcenter toggle device carried by said yoke between the legs thereof and coupled by a lost motion connection to said switch member, the movement of said yoke a predetermined amount in one direction causing said device to be moved overcenter to move said switch member to closed circuit position with a snap action, and the movement of said yoke a predetermined amount in the opposite direction causing said device to be moved overcenter in an opposite sense to move said switch member to open circuit position with a snap action.

14. In a circuit controlling device, relatively movable contacts, a switch member movable to open or to closed circuit position to open or to close said contacts, actuating means for moving said switch member to open or to closed circuit position with a snap action to secure quick make and break action of said contacts comprising a movable yoke, a snap acting overcenter spring strip having its ends secured to the legs of said yoke and its central portion coupled to said switch member, and temperature responsive means for moving said yoke in accordance with predetermined changes in temperature, said switch member and contacts being mounted on a support separate from said overcenter spring strip.

15. In a circuit controlling device, relatively movable contacts, a switch member movable to open or to closed circuit position to open or to close said contacts, actuating means for moving said switch member to open or to closed circuit position with a snap action to secure quick make and break action of said contacts comprising a movable yoke, a snap acting overcenter spring strip having its ends secured to the legs of said yoke and its central portion coupled to said switch member, and temperature responsive means for moving said yoke in accordance with predetermined changes in temperature, and means associated with said contacts for preventing secondary interruptions due to bouncing on closing of said contacts.

16. In a circuit controlling device, a stationary contact, a cooperating movable contact, a pivotally mounted switch arm carrying said movable contact, said switch arm being movable to open or to closed circuit position, snap acting actuating means for the switch arm comprising a movable yoke, an overcenter spring toggle device carried by said yoke and coupled to said switch arm, and a stop member independent of said contacts, the movement of said yoke a predetermined amount in one direction when said switch arm is in open circuit position causing said stop member to effect movement of the toggle device overcenter to move said switch arm to closed circuit position with a snap action and the movement of said yoke a predetermined amount in the opposite direction when said switch arm is in closed circuit position causing said toggle device to move overcenter to move the switch arm to open circuit position with a snap action.

17. In a circuit controlling device, a stationary contact, a cooperating movable contact, a pivoted switch arm carrying said movable contact, said switch arm being movable to open or to closed circuit position, snap acting actuating means for the switch arm comprising a movable yoke, an overcenter spring toggle device carried by said yoke and coupled to said switch arm, and a stop member independent of said contacts, the movement of said yoke a predetermined amount in one direction when said switch arm is in open circuit position causing said stop member to effect movement of the toggle device overcenter to move said switch arm to closed circuit position with a snap action and the movement of said yoke a predetermined amount in the opposite direction when said switch arm is in closed circuit position causing said toggle device to move overcenter to move the switch arm to open circuit position with a snap action, and temperature responsive means for moving said yoke, said switch arm and said contacts being mounted on a support separate from said toggle device.

18. In a circuit controlling device, a stationary contact, a cooperating movable contact, a switch arm carrying said movable contact, said switch arm being movable to open or to closed circuit position, snap acting actuating means for the switch arm comprising a movable yoke, an overcenter spring toggle device carried by said yoke and coupled to said switch arm, and a stop member, the movement of said yoke a predetermined amount in one direction when said switch arm is in open circuit position causing said stop member to effect movement of the toggle device overcenter to move said switch arm to closed circuit position with a snap action and the movement of said yoke a predetermined amount in the opposite direction when said switch arm is in closed circuit position causing said toggle device to move overcenter to move the switch arm to open circuit position with a snap action; and adjusting means independent of said contacts for changing the amount of movement of said yoke necessary to cause the toggle device to be moved overcenter.

19. In a circuit controlling device, a stationary contact, a cooperating movable contact, a switch arm carrying said movable contact, said switch arm being movable to open or to closed circuit position, snap acting actuating means for the switch arm comprising a movable yoke, an overcenter spring toggle device carried by said yoke and coupled to said switch arm, and an adjustable stop member independent of said contacts, the movement of said yoke a predetermined amount in one direction when said switch arm is in open circuit position causing said adjustable stop member to effect movement of the toggle device overcenter to move said switch arm to closed circuit position with a snap action and the movement of said yoke a predetermined amount in the opposite direction when said switch arm is in closed circuit position causing said toggle device to move overcenter to move the switch arm to open circuit position with a snap action, the adjustment of said stop member determining the amount of movement of said yoke necessary to cause the toggle device to be moved overcenter.

20. In a circuit controlling device, a stationary contact, a cooperating movable contact, a switch arm carrying said movable contact, said switch arm being movable to open or to closed circuit position, snap acting actuating means for the switch arm comprising a movable yoke, an overcenter spring toggle device carried by said yoke and coupled to said switch arm, and an adjustable stop member independent of said contacts, the movement of said yoke a predetermined amount in one direction when said switch arm is in open circuit position causing said adjustable stop member to effect movement of the toggle device overcenter to move said switch arm to closed circuit position with a snap action and the movement of said yoke a predetermined amount in the opposite direction when said switch arm is in closed circuit position causing said toggle device to move overcenter to move the switch arm to open circuit position with a snap action, the adjustment of said stop member determining the amount of movement of said yoke necessary to cause the toggle device to be moved overcenter, and temperature responsive means for moving said yoke.

21. In a circuit controlling device, relatively movable contacts, a contact controlling member movable to open or to closed circuit position to open or to close said contacts, operating means for moving said member to open or to closed circuit position with a snap action comprising a movable yoke, a snap acting spring strip having its ends secured to the legs of said yoke to hold the strip in bowed stressed condition and having its central portion coupled to said member, a predetermined amount of movement of said yoke causing said strip to snap overcenter and move said contact controlling member, and adjustable stop means independent of said contacts cooperating with said strip for changing the amount of movement of the yoke necessary to cause movement of said contact controlling member.

22. In a circuit controlling device, a contact controlling member movable to open or to closed circuit position to open or to close the circuit, operating means for moving said member to open or to closed circuit position with a snap action comprising a movable yoke, a snap acting bowed spring strip the ends of which are secured to the legs of said yoke to hold said strip in bowed stressed condition, lost motion connecting means for coupling said contact controlling member to the central portion of said strip, a predetermined amount of movement of said yoke causing the central portion of said strip to snap overcenter and move said contact controlling member, and adjusting means for changing the amount of movement of said yoke necessary to cause movement of said contact controlling member.

23. In a circuit controlling device, relatively movable contacts, actuating means for opening or for closing said contacts with a snap action comprising a movable operating member, an overcenter spring device carried by said member and coupled to one of said contacts, ambient temperature responsive means for moving said member in one direction in response to rising temperature and in the opposite direction in response to decreasing temperature, a predetermined amount of movement of said member in said opposite direction due to decreasing temperature when said contacts are closed causing said spring device to snap overcenter to open said contacts with a snap action, a predetermined amount of movement of said member in said one direction due to a temperature rise when said contacts are open causing said spring device to snap overcenter to close said contacts with a snap action, a continued movement of said member above said predetermined amount in said one direction due to a continuing rise of temperature effecting separation of said contacts.

24. In a circuit controlling device, a stationary contact, a cooperating movable contact, actuating means for moving said movable contact to open and to closed circuit position comprising a movable operating member, an overcenter device carried by said movable operating member and coupled to said movable contact to cause an opposite sense movement of said movable contact to closed circuit position with a snap action when said operating member is moved a predetermined amount in one direction, and to cause an opposite sense movement of said movable contact to open circuit position with a snap action when said operating member is moved a predetermined amount in the opposite direction, a thermally responsive actuator connected to said operating member for moving the operating member in said one direction in response to a rise in temperature and in the opposite direction in response to a decrease in temperature, and stop means independent of said contacts for limiting movement of the operating member in said one direction to prevent opening of said contacts in response to a continued rise in temperature.

25. In a circuit controlling device, relatively movable contacts, actuating mechanism therefor comprising snap acting means for opening and closing said contacts with a snap action, an ambient temperature responsive thermal means movable in one direction in response to rising ambient temperature to cause said snap acting means to close said contacts when said ambient temperature reaches a predetermined high value, and movable in an opposite direction in response to decreasing ambient temperature to cause said snap acting means to open said contacts when said ambient temperature reaches a predetermined low value, the continued movement of said thermal means a predetermined amount in said one direction due to the ambient temperature rising above said predetermined high value causing said actuating mechanism to open said contacts.

26. In a circuit controlling device, a stationary contact, a cooperating movable contact, actuating means for moving said movable contact to open and to closed circuit position comprising a movable operating member, an overcenter device carried by said movable operating member and coupled to said movable contact to cause an opposite sense movement of said movable contact to closed circuit position with a snap action when said operating member is moved a predetermined amount in one direction, and to cause an opposite sense movement of said movable contact to open circuit position with a snap action when said operating member is moved a predetermined amount in the opposite direction, a thermally responsive actuator connected to said operating member for moving the operating member in said one direction in response to a rise in temperature and in the opposite direction in response to a decrease in temperature, and an adjustable stop means independent of said contacts adjustable to a position in which it limits movement of the operating member in said one direction to prevent opening of said contacts in response to a continued rise in temperature.

RICHARD H. PROCTER.